United States Patent [19]
Bruen et al.

[11] 3,816,095
[45] June 11, 1974

[54] METHOD FOR RECOVERING CHROMIUM VALUES FROM CHROMITE ORE

[75] Inventors: Charles Patrick Bruen, Bernardsville, N.J.; William Wayne Low, Syracuse; Edmund Walter Smalley, Brewerton, both of N.Y.

[73] Assignee: Allied Chemical Corporation, New York, N.Y.

[22] Filed: Mar. 9, 1972

[21] Appl. No.: 233,286

[52] U.S. Cl.............. 75/3, 252/188.3, 264/15, 423/53, 423/61
[51] Int. Cl............................................. C22b 1/24
[58] Field of Search...... 423/61, 53; 75/.5 R, .5 DB, 75/3; 252/188.3; 264/15

[56] References Cited
UNITED STATES PATENTS

| | | | |
|---|---|---|---|
| 2,394,793 | 2/1946 | Maier | 75/3 |
| 3,095,266 | 6/1963 | Lauder et al. | 423/61 |
| 3,105,756 | 10/1963 | Green | 423/61 |

*Primary Examiner*—Herbert T. Carter
*Attorney, Agent, or Firm*—Gerard P. Rooney; Jack B. Murray, Jr.

[57] ABSTRACT

A method for recovering chromium values from chromite ore which initially involves pelleting a mixture of chromite ore and soda ash, preferably without the inclusion of recycled leached chromite ore residue or other refractory diluent, employing water, or preferably an electrolyte such as an aqueous solution of sodium hydroxide, potassium hydroxide, sodium aluminate, sodium silicate, sodium chromate or a mixture thereof as the pelleting liquid. To reduce the tendency of the pellets to melt and fuse during the roasting step, the chromite ore is heated under oxidizing conditions, either before or after being incorporated into the pellets, to an extent sufficient to oxidize at least 40% of the contained ferrous oxide to the ferric state. The pellets are next roasted under oxidizing conditions, preferably in a static bed, then disintegrated and extracted to obtain an aqueous solution of the soluble sodium chromate thus formed.

20 Claims, No Drawings

METHOD FOR RECOVERING CHROMIUM VALUES FROM CHROMITE ORE

CROSS-REFERENCE TO RELATED APPLICATIONS

Co-filed U.S. patent applications, "Process for the Production of Sodium Chromate from Chromite Ore," and "Method for the Conversion of Chromite Ore to Sodium Chromate," Ser. Nos. 233,351 and 233,128, respectively.

BACKGROUND OF THE INVENTION

1. Field of the Invention

This invention relates to the recovery of the chromium values of chromite ore, and more particularly, to a method for the alkaline roasting of the ore.

2. Description of the Prior Art

In the past, chromite ore has generally been dried, powdered, mixed with an alkali carbonate such as soda ash, leached residue, and an alkaline earth compound such as lime. It has then been charged into a rotary kiln wherein it was subjected to high temperatures and oxidizing conditions.

This procedure has several disadvantages. Fines are carried through the furnace introducing losses and creating a noxious atmosphere. Furthermore, at the high temperatures obtained during the roasting process, the powdered charge becomes viscid, and as a result the material agglomerates or forms deposits upon the walls of the kiln, thus interfering with its operation. The reactive surface is considerably diminished by the agglomeration so that the oxidation reaction is generally incomplete. This action is reflected in poor yields of sodium chromate.

In an attempt to overcome these disadvantages, more recent processing techniques involve pelleting the feed mix. In order to obtain pellets with sufficient strength to withstand the stresses introduced by the use of a rotary kiln, it has been considered necessary to add alkaline earth compounds, lime generally being the one selected. Essentially all processes disclosed in the prior art which involve the use of pellets, indicate that lime or an alkaline earth compound is considered necessary for successfully pelleting the furnace or kiln feed. The supposed need for the lime stems from the requirement that the pellets or balls have sufficient strength at several key points in the processing operation in order to survive handling and the roasting operation. The use of lime or other alkaline earth agents has, in fact, been essentially the only known way of achieving this strength. The amount of lime introduced has been considered critical. In addition, a high temperature pre-treatment was generally considered necessary to achieve adequate pellet strength.

Whereas this procedure furnished a solution to the problems encountered in the alkaline roasting of the chromite ore, the use of lime introduced new difficulties, which although long recognized, had not been overcome.

The presence of lime in the roast results in the formation of slimes in the subsequent leaching operation. This has forced the continued use of archaic leach cars or other difficult and expensive operations. These slimes result in poor recovery of the chrome values and complicate considerably the task of rendering the leach residue harmless from a pollution standpoint.

Lime is also used in most non-pellet processes, because of its action as a diluent, to prevent sticking.

There are many known ways of producing balls or pellets from powdered mixes. They range from mechanical presses or rolls to the balling drums or rotating pans commonly used in the processing of iron ore. The latter two are probably the most common.

In the manufacture of chrome chemicals, it is highly advantageous to use a pelleted feed in the roasting operation. As noted, the pellet form, as opposed to powdered mixes, reduces dust problems. It also reduces the tendency for tacky masses to stick to the kiln walls ("ringing") and serves to prevent the formation of large lumps. Furthermore, it reduces segregation of the ingredients within the mix and permits higher kiln loadings and better heat transfer.

After the roasting step, the pellet form has no advantage and may be a disadvantage if the pellets are so hard as to interfere with the rapid and complete leaching of the soluble sodium chromate, and in the subsequent rendering of the extracted residue sufficiently innocuous for discard or in the preparation of at least a portion of this residue for recycle. It is therefore most desirable that, after the roasting step, the pellets be easy to disintegrate.

Water is generally the liquid used to plasticize the dry mix for the production of the green (wet, untreated) balls or pellets. For the production of chrome chemicals, the green pellets must have sufficient strength to be handled and conveyed, and to survive any preliminary heat treating step required. Finally, they must have sufficient strength to survive transfer to the kiln and particularly the roasting step.

In the past, as has been stated, essentially the only known method of producing a dried pellet of powdered chrome ore, sodium carbonate and recycled residue or other refractory diluent having the required strength, was to add an alkaline earth compound such as lime to the mixture, and this was done even though it was known that the introduction of such an alkaline earth compound would add to the difficulties of leaching the sodium chromate from the roasted and disintegrated pellet.

The use of a refractory diluent such as recycled extracted chromite ore residue or pyrites cinder in combination with other ingredients in a chromium ore pellet, contributes to its strength, and reduces the production of tacky agglomerates. Unlike the use of lime or other alkaline earth compounds, the refractory diluent generally does not appreciably complicate the subsequent extraction step, and so is appropriately considered an important ingredient of the chrome ore pellet, particularly when the pellets constitute the charge to a rotary furnace or kiln. There are, however, obvious disadvantages to the use of such a diluent, even if unavoidable within the scope of the prior art. Recycling inert material always adds to capitalization costs, to which, in this specific instance, can be added the additional costs of fuel, labor and maintenance; for more equipment, power, and even working space are required per unit of product, then would be required if the use of the refractory diluent could be greatly reduced or eliminated.

SUMMARY OF THE INVENTION

A pellet formed from pulverized chromite ore and soda ash, where no refractory diluent is present, will melt and fuse during the roasting operation, resulting in poor yields. However, we have now found, surprisingly, that if the chromite ore is subjected to pre-oxidation prior to roasting, whereby at least 40% and preferably at least 60% of the ferrous iron contained in the ore is oxidized to the ferric state, a pellet is obtained which can withstand roasting without fusion or appreciable sintering. Such a pellet, when roasted, can be readily disintegrated for the subsequent leaching step.

The pre-oxidation step can be carried out on the pulverized chromite ore before it is mixed with the soda ash, or alternately the pulverized ore, not previously oxidized, can be combined with the soda ash, made into pellets, dried, and the ore then oxidized in situ.

It either case the green pellets can be prepared using water which may if desired contain dissolved substances as the pelleting liquid, or preferably, by using an electrolyte as the pelleting liquid, consisting of an aqueous solution of sodium hydroxide, potassium hydroxide, sodium aluminate, sodium silicate, sodium chromate or mixtures thereof, wherein the solution has a concentration of at least about 5% by weight.

Although not preferred, refractory diluents such as pyrites cinder or recycled extracted chromite ore residues can be introduced into the pellet in amounts between 0 and 200% of the weight of the ore used. Although such diluents can increase equipment and power costs, they do contribute to a stronger pellet, and may be used advantageously, particularly when the quantity introduced is relatively small. The presence of a diluent not only contributes to pellet strength, but also functions to prevent the pellets from becoming viscid during the roasting step. For this reason, it is surprising that the pellets of this invention can be satisfactorily roasted without the use of a diluent or an alkaline earth compound such as lime.

Not every type of kiln is appropriate, however. A rotary kiln is not recommended for lime and diluent-free pellets, for the tumbling action tends to make these pellets exude melt and become tacky. At the high temperatures involved, the corrosive action of such viscid pellets can reduce the life of a furnace, and the lumps and deposits which form on the kiln wall, interfere with the efficiency of the roasting operation.

The fact that lime and diluent-free pellets can be successfully roasted in a corrosion resistant furnace having a static bed, such as a "traveling grate" furnace, is therefore unexpected. Such a furnace may be of the "straight grate" or "circular grate" variety, wherein the pellet bed moves through a high temperature oxidizing zone, and is not subjected to the high stress conditions imposed by a rotary furnace. When water is used as the pelleting liquid, the pellets have sufficient strength for transfer to such a static bed furnace, where, if desired, the drying, pre-oxidation (if done in situ) and roasting can all be carried out in separate heating zones of the same furnace, wherein the pellet bed moves from one zone to another.

Once these pellets become anhydrous, however, they no longer have sufficient strength to withstand handling, but on a static traveling grate, they can very satisfactorily and advantageously be subjected to the ferrous iron oxidation step, and subsequently to the roasting operation, by passing from one temperature zone to another.

In the preferred method of "balling" or pelleting wherein the pelleting liquid is a solution of sodium hydroxide, potassium hydroxide, sodium aluminate, sodium silicate or sodium chromate having a concentration of at least about 5%, the pellets can be dried in a separate low-temperature dryer, and would then have sufficient strength for transfer to a high temperature, corrosion resistant, static bed furnace for the pre-oxidation step (if done in situ) and the roasting step. Alternately, as before, the drying step, as well as the pre-oxidation and roasting steps can all be carried out in a single corrosion resistant traveling grate (straight grate or circular grate) furnace, but probably at higher equipment cost, for a larger static bed furnace would be required.

When such a "static bed" furnace is employed, the pellets produced by the method of the present invention are most satisfactory. They can be readily disintegrated and leached, and offer the several advantages previously mentioned.

The pellets, wherein the ferrous iron is oxidized in situ, or those prepared from pre-oxidized chromite ore are of such a character as to withstand normal handling and the high temperature roasting operation in a furnace of the "static bed" type, wherein the trivalent chromium content of the ore is oxidized, in the presence of oxygen, to the hexavalent state. Normally the oxygen is provided by the presence of air which is made to pass through the furnace during the roasting step. By a "static bed" furnace, we mean a furnace wherein there is no appreciable motion of the bed with respect to the supporting grate, during the roasting operation.

DESCRIPTION OF THE PREFERRED EMBODIMENT

The process of the present invention is directed to a method of obtaining aqueous solutions of sodium chromate from chromite ore. More particularly, the process is directed to a method of producing pellets of a mixture of chromite ore and soda ash using water, dilute aqueous solutions of electrolytes, or preferably an aqueous solution of at least one member of the group consisting of sodium hydroxide, potassium hydroxide, sodium aluminate, sodium silicate and sodium chromate. A mixture of two or more of these could be employed, but to no substantial advantage. Of these five compounds, sodium hydroxide is preferred since a lesser amount is required, no foreign substance is introduced, it is relatively inexpensive and the sodium value is not lost. The pellets produced by the present process are of such a character and strength as to withstand the stress of handling and of roasting in a static bed furnace without melting or fusing. This strength and character is obtained, surprisingly, without the inclusion of lime or other alkaline earth compounds, without the inclusion of recycled extracted chromite ore residues or other refractory diluents in the composition of the pellets, and without the difficulties and additional costs which attend the use of such additives. Of course the use of these additives is not precluded. If desired, a refractory diluent such as recycled extracted chromite ore residue, pyrites cinder, or other inerts may be incorporated into the mix in an amount between 0 and 200% of the weight of the chromite ore.

As illustrative of a preferred method of the present invention, a portion of dry chromite ore is comminuted and heated at a temperature within the range of 500° to 925° C. for a period of between 20 minutes and 5.0 hours. The time and temperature should be sufficient to permit oxidation of at least 40% and preferably over 60 wt.% of the ferrous iron present in the chromite ore, to the ferric state. This pre-oxidation step need not, and at these temperatures normally does not, have an appreciable effect on the valence state of the trivalent chromium in the ore.

The pre-oxidized powdered ore is next mixed with an amount of finely divided soda ash equivalent to between 80 and 200%, preferably between 100 and 140%, of the stoichiometric amount required to produce sodium chromate from the chromium content of the ore. This mixture is fed into pelleting apparatus, and before, or preferably during the pelleting operation, water, a dilute aqueous solution of an electrolyte, or an aqueous solution of sodium hydroxide having a concentration of preferably 5 to 55 wt.% or more desirably 7 to 25% is sprayed onto the mixture in an amount sufficient to contribute about 0.5 to 25%, preferably 1 to 20%, or more desirably 2 to 10% NaOH to the weight of the pellet (dry basis). The green pellets are next dried at temperatures up to 500° C. The drying step can be carried out under reduced pressure if desired, but no particular advantage is gained thereby. These dry pellets are next roasted, preferably in a "straight grate" or "circular grate" static bed furnace or its equivalent, under oxidizing conditions, at temperatures between 900° and 1,350° C., preferably between 925° and 1,260°C.

By a "straight grate" kiln or furnace we mean a high temperature furnace wherein the pellets, supported on a moving grate, belt, or screen, are moved through the high temperature oxidizing zone without being appreciably tumbled or subjected to the stresses occasioned by the use of a rotary furnace.

Finally, the roasted pellets are cooled, crushed, and extracted with water to obtain an aqueous solution of sodium chromate, known to those skilled in the art as "yellow liquor."

The extracted residue is washed with water, which wash can be combined with the sodium chromate solution, and the residue is either discarded, or dried, crushed and held as recycle in runs where the importance of a strong pellet which does not become viscid under stress at high temperatures outweighs the advantages of operating without the addition of a refractory diluent. The quantity of such diluent may be varied from 0 to about 200% of the weight of the chromite ore.

As an alternate method the same procedure can be followed except that the pellets are prepared from the comminuted chromite ore, finely divided soda ash and water, or a solution containing at least 5 wt.% of sodium hydroxide, potassium hydroxide, sodium aluminate, sodium silicate or sodium chromate, without first subjecting the ore to an oxidation step. The pellets are then dried preferably at up to 500° C. At this point, rather than being immediately subjected to high temperature roasting, the pellets are pre-oxidized by being heated under oxidizing conditions at a temperature of preferably 500° to 925° C. for a period of preferably between 20 minutes and 5.0 hours. In this way at least 40% and preferably better than 60% of the ferrous oxide content of the chromite ore in the pellet is oxidized in situ to the higher valent ferric state. In other words the chromite ore may be pre-oxidized before being combined with soda ash, or it may be combined with soda ash, pelleted with water, and/or an aqueous solution of sodium hydroxide or the other electrolytes previously listed, and the pellet then pre-oxidized. In either case this preliminary oxidation of the iron content of the ore prior to the roasting step permits the preparation of a lime-free, diluent-free pellet having sufficient strength for handling and furnacing in a static bed furnace without melting or fusing. The subsequent furnacing of the pellets at high temperature under oxidizing conditions to raise the contained trivalent chromium to the hexavalent state, and the disintegration and the aqueous extraction of the roasted pellets, is the same.

Throughout this specification where reference has been made to pelleting with water as a pelleting agent, we mean to include as water, water containing dissolved substances. The water may comprise dilute solutions of the electrolytes sodium hydroxide, sodium carbonate, potassium hydroxide, sodium aluminate, sodium silicate, sodium chromate or mixtures thereof. It should also be emphasized that even where "pure" water is used as the pelleting liquid, it becomes on application, a solution of sodium carbonate, because of that constituent of the pelleting mix. It is only when the concentrations of the electrolytes, such as sodium hydroxide become appreciable (over about 5%) that they begin to have a significant effect on the structural strength of the dried pellet produced.

Because of the structure of the pellets, the ease with which they are disintegrated after the roasting step, and the fact that there is no lime present to produce slimes, the sodium chromate can be extracted rapidly, economically, and in exceptionally good yield.

It is entirely possible to recover considerably better than 90% of the available chromium by the method of this process.

In the examples that follow, and throughout this specification, all parts and percentages are on a weight bases.

EXAMPLE 1

A quantity of dry comminuted ore containing about 45% $Cr_2O_3$ is divided into two portions. One portion is maintained at a temperature of 800° C. for 30 minutes in the presence of air. One hundred parts of both the unoxidized portion and the portion of ore oxidized by the above procedure, are separately mixed with 85 parts of finely divided soda ash representing about 136% of the stoichiometric amount required to produce sodium chromate from the chromium value of the ore. These two mixtures are separately "balled" or pelleted on a rotating balling pan while 51.8 parts of a 10.7% aqueous solution of sodium hydroxide are sprayed on the mixture at ambient temperature to thereby contribute 2.9 percent NaOH to the pellets, dry basis. These pellets are found to contain 19.5% moisture and about 147% of the stoichiometric amount of alkali required to produce sodium chromate from the chromium value of the ore. After drying at 200° C., the pellets are roasted in an oxidizing atmosphere for 2 hours at 1,177° C. in a static bed. After the roasting step, the pellets are examined, then crushed and leached with water. The portion which has been pre-oxidized consists of discrete pellets, which on crushing and leaching give up 95.9% of the chromium value of the original ore. The portion not pre-oxidized is found to be fused, and on crushing and leaching, yields only 76.4% of the chromium value of the original ore. This example clearly illustrates the fact that good yields of sodium chromate can be obtained without the use of diluents or alkaline earth additives when the pre-oxidation technique of the present invention is employed.

EXAMPLE 2

100 Parts of dry comminuted ore containing about 45% $Cr_2O_3$ are mixed with 74 parts of finely divided soda ash, representing about 118% of the stoichiometric amount of said ash required to produce sodium chromate from the chromium value of the ore. This mixture is "balled" or pelleted on a rotating balling pan while 43.4 parts of a 10.7% aqueous solution of sodium hydroxide is sprayed on the mixture at ambient temperature to thereby contribute 2.6% NaOH to the pellets (dry basis). These pellets are found to contain 17.9% moisture and about 128% of the stoichiometric amount of alkali required to produce sodium chromate from the chromium value of the ore. The pellets are then dried. The anhydrous pellets are now divided into three portions. The first portion is not oxidized whereas the other two are oxidized at two different temperatures, namely 500° C. and 800° C. to oxidize the ferrous iron contained in the ore, in situ. After the pre-oxidation treatment the pellets are roasted in an oxidizing atmosphere for 2 hours at 1,177° C. in a static bed. Upon completion of the roasting operation the pellets are examined, then leached with water, and the yield of sodium chromate based on the available chromium in the ore, calculated. The results are tabulated below:

| Pre-oxidation Time, min. | Temp. °C. | Condition of Pellets after Roasting | % Recovery of the Original Chromium Value of the Ore |
|---|---|---|---|
| None | — | fused | 71.6 |
| 30 | 500°C. | discrete pellets | 94.2 |
| 30 | 800°C. | discrete pellets | 94.9 |

The practicability of using a chromite ore-soda ash mixture without either alkaline earth additives or recycled leached residue, is here demonstrated, using the technique of pre-oxidizing the ferrous iron in the chromite ore, in situ, according to the preferred method of the present invention.

EXAMPLE 3

A quantity of dry comminuted ore containing about 45% $Cr_2O_3$ is oxidized in a fluid bed, directly gas fired to 850° C. Of the ferrous iron originally present in the ore, 63% is oxidized to the ferric state. 100 Parts of this pre-oxidized ore and a control consisting of 100 parts of the original ore, not pre-oxidized, are mixed with 73.3 parts of finely divided soda ash representing about 117% of the stoichiometric amount required to produce sodium chromate from the chromium value of the ore. These two mixtures are separately "balled" or pelleted on a rotating balling pan while 44.9 parts of a 10.7% aqueous solution of sodium hydroxide is sprayed on the mixture at ambient temperature to thereby contribute 2.7% NaOH to the pellets (dry basis). These pellets are found to contain 18.1% moisture and about 127% of the stoichiometric amount of alkali required to produce sodium chromate from the chromium value of the ore. After drying at 200° C., the pellets are roasted in an oxidizing atmosphere for 2 hours at 1,150° C. in a static bed. Following the roasting step, the pellets are examined, then leached with water, and the yield of sodium chromate relative to the available chromium in the ore, calculated. The results are tabulated below:

| Ore Treatment | Condition of Pellets after Roasting | % Recovery of the Original Chromium Value of the Ore |
|---|---|---|
| None | partly fused | 73.0 |
| oxidized in fluid bed | discrete pellets, not fused | 92.2 |

This example is similar to the first rather than the second, for in both instances the ore is oxidized before being compounded. It differs from Example 1, however, in that the ore was oxidized at a somewhat higher temperature, and in a direct gas fired fluid bed, rather than in a static bed.

EXAMPLE 4

100 Parts of dry comminuted ore containing about 45% $Cr_2O_3$ is mixed with 92.8 parts of finely divided soda ash, representing about 148% of the stoichiometric amount of soda ash required to produce sodium chromate from the chromium value of the ore. This mixture is "balled" or pelleted using only water as the balling medium. The wet pellets are found to contain 14.5% water. The pellets are dried and the anhydrous pellets are divided into four portions. The first portion is not subjected to pre-oxidation, whereas the remaining three are oxidized at three different temperatures, namely 500° C., 600° C., and 800° C. to oxidize the ferrous iron in the ore, in situ. After the pre-oxidation treatment, the pellets are roasted in an oxidizing atmosphere for 2 hours at 1,177° C. in a static bed. After the roasting operation, the pellets are examined, then leached with water, and the yield of sodium chromate relative to the chromium originally available in the ore, calculated. The results are tabulated below:

| Pre-oxidation Time, min. | Temp. °C. | Condition of Pellets after Roasting | % Recovery of the Original Chromium Value of the Ore |
|---|---|---|---|
| None | — | fused | 70.0 |
| 30 | 500° | partially sintered | 79.1 |
| 30 | 600° | discrete pellets | 97.3 |
| 30 | 800° | discrete pellets | 97.6 |

This example demonstrates the practicability of using only water as the pelleting liquid. It also indicates that oxidation temperatures should be kept above 500° C. for the best yields.

EXAMPLE 5

100 Parts of dry comminuted ore containing about 45% $Cr_2O_3$ is mixed with 75 parts of finely divided soda ash, representing about 120% of the stoichiometric amount required to produce sodium chromate from the chromium value of the ore. This mixture is divided into four portions, and each is pelleted in a rotary balling pan by spraying on 13 parts by weight of one of four different pelleting liquids at room temperature. These pelleting liquids comprise 11% aqueous solutions of each of the following: potassium hydroxide, sodium aluminate, sodium silicate, and sodium chromate. Each of these solutions contribute 3.2% of its respective compound to the pellet, dry basis. The pellets are found to contain 20% moisture.

After drying at 200° C., the pellets are oxidized for 30 minutes at 800° C., until better than 60% of the contained ferrous oxide is oxidized to the ferric state. The pre-oxidized pellets are now roasted in an oxidizing atmosphere for 2 hours at 1,177° C. in a static bed. Following the roasting operation, the pellets are examined, then crushed and leached with water.

The yield of sodium chromate based on the available chromium in the ore is calculated. The results are tabulated below:

| Pelleting Solution 11% | Pre-oxidation Temp. °C. | Condition of Pellet after Roasting | % Recovery of the Chromium Content of the Ore |
|---|---|---|---|
| KOH | 800°C. | discrete pellets | 97.3% |
| NaAlO$_2$ | do. | do. | 88.7% |
| Na$_2$O·2SiO$_2$ | do. | do. | 92.1% |
| Na$_2$CrO$_4$ | do. | do. | 95.6% |

This example demonstrates that solutions of all four of these compounds can be used as pelleting liquids, and they do not interfere with the favorable roasting results obtained when about 60% of the ferrous iron in the chromite ore is oxidized to the ferric state prior to roasting.

To summarize, pre-oxidation of at least 40% of the ferrous iron content of chromite ore to the ferric state prior to roasting obviates the tendency of chromite ore-soda ash pellets to fuse or sinter during the roasting operation and results in high yields of sodium chromate. The chromite ore can be pre-oxidized prior to mixing with soda ash and pelleting. Alternately, the pellets can first be formed from ore which has not been pre-oxidized, but which is oxidized in situ after the formation of the pellets. A corrosion resistant straight or circular grate furnace having a static bed and a traveling grate is recommended for roasting pellets containing only pre-oxidized chromite ore and soda ash. Water or preferably an aqueous solution of caustic soda can be used as the pelleting liquid. Alternately, a pelleting liquid comprising an aqueous solution of one of the group consisting of potassium hydroxide, sodium aluminate, sodium silicate, and sodium chromate can be used.

By eliminating the use of lime or other alkaline earth compounds, processing of the roasted ore to obtain sodium chromate is greatly facilitated. By further eliminating a refractory diluent such as recycled leached residue, savings in power, fuel, and capitalization costs can be had.

Since certain changes may be made in carrying out the above process without departing from the scope of the invention, it is intended that all matter contained in the above description shall be interpreted as illustrative and not in a limiting sense.

We claim:

1. A method of producing a green pellet of chromite ore which comprises heating chromite ore containing ferrous iron in an oxidizing atmosphere to oxidize at least 40% of the contained ferrous iron to the ferric state, mixing the oxidized chromite ore with sodium carbonate in the proportion of 80 to 200% of the stoichiometric amount required to produce sodium chromate from the chromium value of the ore, and pelleting the mix.

2. The method of claim 1 wherein the chromite ore is heated in an oxidizing atmosphere within the range of about 500° to 925° C. for at least about 20 minutes.

3. The method of claim 1 wherein water is used as a pelleting liquid.

4. The method of claim 1 wherein a pelleting liquid is used which is an aqueous solution containing at least 5% of a compound selected from the group consisting of sodium hydroxide, potassium hydroxide, sodium aluminate, sodium silicate and sodium chromate.

5. The method of claim 4 wherein the solution is added in an amount sufficient to contribute about 0.5 to 25% of the selected compound to the pellet, dry basis.

6. The method of claim 1 wherein there is included in the dry mix, a quantity of a refractory diluent in an amount up to 200% of the weight of the chromite ore used.

7. The method of claim 1 wherein the green pellets are dried at temperatures up to 500° C.

8. A method for producing green pellets of chromite ore comprising mixing said chromite ore with sodium carbonate in the proportion of 80% to 200% of the stoichiometric amount of said sodium carbonate required to produce sodium chromate from the chromium value of the ore, pelleting the mixture using a pelleting liquid, drying the pellets at a temperature within the range of 100° to 500° C., and oxidizing at least 40% of the ferrous iron contained in the chromite ore to the ferric state by heating said pellets at a temperature between about 500° and 925° C. under an oxidizing atmosphere for a period of time sufficient to convert said ferrous iron to the ferric state.

9. The method of claim 8 wherein the drying of the green pellets and the oxidation of the contained ferrous iron in the dry pellets to ferric iron is carried out in graduated temperature zones of a travelling grate or hearth furnace.

10. The process of claim 8 wherein the pelleting liquid is water.

11. The method of claim 8 wherein the pelleting liquid is an aqueous solution containing 5 to 55% of a compound selected from the group consisting of sodium hydroxide, potassium hydroxide, sodium aluminate, sodium silicate and sodium chromate.

12. The method of claim 11 in which the solution is added in an amount sufficient to contribute about 0.5 to 25% of the selected compound to the pellet, dry basis.

13. The method of claim 11 wherein the selected compound is sodium hydroxide.

14. The method of claim 8 wherein there is included in the dry mix, a quantity of a refractory diluent in an amount equal to between 0 and 150% of the weight of the chromite ore used.

15. The method of claim 14 wherein the refractory diluent is recycled residue.

16. The method of claim 14 wherein the refractory diluent is pyrites cinder.

17. A green pellet composed of a mixture of chromite ore having at least 40% of the ferrous iron contained in the chromite ore oxidized to the ferric state, and sodium carbonate in the proportion of 80 to 200% of the stoichiometric amount required to produce sodium chromate from the chromium value of the ore.

18. A green pellet of claim 17 containing an inert refractory diluent in an amount up to 200% of the weight of the chromite ore used.

19. The green pellet of claim 18 wherein the inert refractory diluent is pyrites cinder.

20. The green pellet of claim 18 wherein the inert refractory diluent is recycled residue.

* * * * *